United States Patent
Bieswanger et al.

(10) Patent No.: US 8,457,805 B2
(45) Date of Patent: Jun. 4, 2013

(54) POWER DISTRIBUTION CONSIDERING COOLING NODES

(75) Inventors: Andreas Bieswanger, Boeblingen (DE); Andrew Geissler, Austin, TX (US); Raymond J Harrington, Staatsburg, NY (US); Hye-Young McCreary, Liberty Hill, TX (US); Freeman Leigh Rawson, III, Austin, TX (US); Malcolm Scott Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/762,166

(22) Filed: Apr. 16, 2010

(65) Prior Publication Data

US 2011/0257802 A1    Oct. 20, 2011

(51) Int. Cl.
G05D 23/00    (2006.01)
(52) U.S. Cl.
USPC .............. 700/295; 700/277; 700/300
(58) Field of Classification Search
USPC .......... 700/291, 295, 299, 300, 277; 713/300, 713/320, 323
See application file for complete search history.

(56) References Cited

U.S. PATENT DOCUMENTS

| 8,032,776 | B2 * | 10/2011 | Merkin | 713/324 |
| 2005/0076255 | A1 | 4/2005 | Bresniker et al. | |
| 2009/0296342 | A1 | 12/2009 | Matteson et al. | |
| 2010/0211810 | A1 * | 8/2010 | Zacho | 713/324 |
| 2011/0077795 | A1 * | 3/2011 | Vangilder et al. | 700/300 |

* cited by examiner

*Primary Examiner* — Ryan Jarrett
(74) *Attorney, Agent, or Firm* — Garg Law Firm, PLLC; Rakesh Garg; Libby Z. Toub (57) ABSTRACT

A method, system, and computer usable program product for power distribution considering cooling nodes in a data processing environment. A power demand of a data processing environment is determined for a period. The data processing environment includes a set of computing nodes and cooling nodes. A determination is made that the power demand will exceed a limit on electrical power available to the data processing environment for the period if the computing nodes and the cooling nodes in the data processing environment are operated in a first configuration. A first amount of power is redistributed from a cooling node in the data processing environment to a computing node in the data processing environment such that a temperature related performance threshold of a subset of computing nodes is at least met.

14 Claims, 4 Drawing Sheets

POWER DISTRIBUTION CONSIDERING COOLING NODES

BACKGROUND OF THE INVENTION

1. Field of the Invention

The present invention relates generally to an improved data processing environment, and in particular, to a computer implemented method for improving the power distribution in the data processing environment. Still more particularly, the present invention relates to a computer implemented method, system, and computer usable program code for power distribution considering cooling nodes.

2. Description of the Related Art

Data processing environments often include multiple data processing systems. The data processing systems each have need for electrical power for performing their respective functions.

In certain data processing environment configurations, such as in a rack, several data processing systems may be configured to receive bulk power over a common power line. The bulk power is then distributed to the various data processing systems via power distribution mechanism.

Availability of electrical power in the amount desired can be a factor in the performance of a data processing system. As a data processing system is loaded with computational workloads, the power consumption of the data processing system can increase.

Different data processing systems may peak in their demand for power at different times. Under certain circumstances, the total power desired by a combination of data processing systems in a rack or other configuration can exceed the bulk power available to that configuration.

The reasons for inadequate bulk power can differ widely from data processing environment to data processing environment. For example, in one data processing environment, not enough power lines may be available to feed the rack or other configuration of data processing systems. In another data processing environment, the total bulk power available in the data processing environment may be insufficient to provide for the power demand of the data processing environment under worst-case scenario bulk power demand of certain configurations.

In certain other data processing environments, power caps may be enforced by a user or supplier of the power. A power cap may not provide adequate power for the worst-case power demand scenario in a data processing environment.

In some cases, a new data processing system may replace an old data processing system in a configuration. The power demands of the new and the old data processing systems may be different for their respective operations. For example, the new data processing system may consume more power for optimal performance as compared to the power consumed by the old data processing systems. Yet, the total bulk power supply to the configuration may remain unchanged after the old data processing system is replaced, forcing the new data processing system to operate within the power footprint of the old data processing system

SUMMARY OF THE INVENTION

The illustrative embodiments provide a method, system, and computer usable program product for power distribution considering cooling nodes. An embodiment determines a power demand of a data processing environment for a period. The data processing environment includes a set of computing nodes and cooling nodes. The embodiment determines that the power demand will exceed a limit on electrical power available to the data processing environment for the period if the computing nodes and the cooling nodes in the data processing environment are operated in a first configuration. The embodiment redistributes a first amount of power, the redistributing being from a cooling node in the data processing environment to a computing node in the data processing environment such that a temperature related performance threshold of a subset of computing nodes is at least met.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The invention recognizes that allocating the expected amount of maximum power requirement to a data processing environment configuration is not desirable. Such an allocation may not be desirable at least because such allocation may result in significant over-capacity of the power equipment that has to be procured to handle that maximum power requirement.

The invention further recognizes that power requirement of a data processing system is also a function of the cooling of the data processing system. Normally, a data processing system temperature should be maintained within a specified temperature range for desirable performance characteristics including power consumption. Temperatures in excess of or below that range may cause the data processing system to operate in less desirable manner and may also consume more power to perform comparable functions.

Given these and other constraints related to power consumption of a data processing system, the invention recognizes that the operation of the cooling systems is a considerable factor in power allocation in a data processing environment. Presently, data processing environment configuration design methodology places a static upper bound on performance for the processors and memory in the configured data processing systems. Such upper bound is selected to that the cooling systems can dissipate the heat output from such systems in the worst-case ambient or altitude conditions.

The invention recognizes that such static limits are now proving to be an unacceptable solution for designs of data processing systems that are pushing the limits in memory capacity and in processor performance. For example, certain high-end computing nodes can include 1 Terabyte of DRAM, and be capable of processor frequencies in the 3.3-3.8 GHz range and a total of up to 32 CPU cores in the computing node.

The demand for improving system performance is ever increasing. Simultaneously, a requirement for staying within the previous generation power envelope is also common in data processing environments.

The illustrative embodiments used to describe the invention generally address and solve the above-described problems and other problems related to power distribution in data processing environments. The illustrative embodiments provide a method, computer usable program product, and data processing system for power distribution considering the power requirements of the cooling nodes in the data processing environment.

An embodiment of the invention may enable the data processing environment to manipulate power distribution to the computing nodes as well as the cooling nodes. A computing node is a data processing system that is employed for performing computational tasks in a data processing environment. A cooling node is a system of any kind that is employed for effecting cooling of the computing nodes and associated devices, racks, and other structures. Using an embodiment, a data processing environment can assess the cooling needs of a given configuration of data processing systems, such as a rack. Upon such determination, the embodiment can redistribute power away from a cooling node and to a computing node, or vice versa, depending on the operating conditions of the configuration.

The illustrative embodiments are described with respect to data, data structures, and identifiers only as examples. Such descriptions are not intended to be limiting on the invention.

Furthermore, the illustrative embodiments may be implemented with respect to any type of data processing system. For example, an illustrative embodiment described with respect to a rack configuration may be implemented using a non-rack mounted configuration within the scope of the invention.

The illustrative embodiments are further described with respect to certain parameters, attributes, and configurations only as examples. Such descriptions are not intended to be limiting on the invention.

An embodiment of the invention may be implemented with respect to any type of data processing system. For example, an embodiment may be implemented with respect to any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
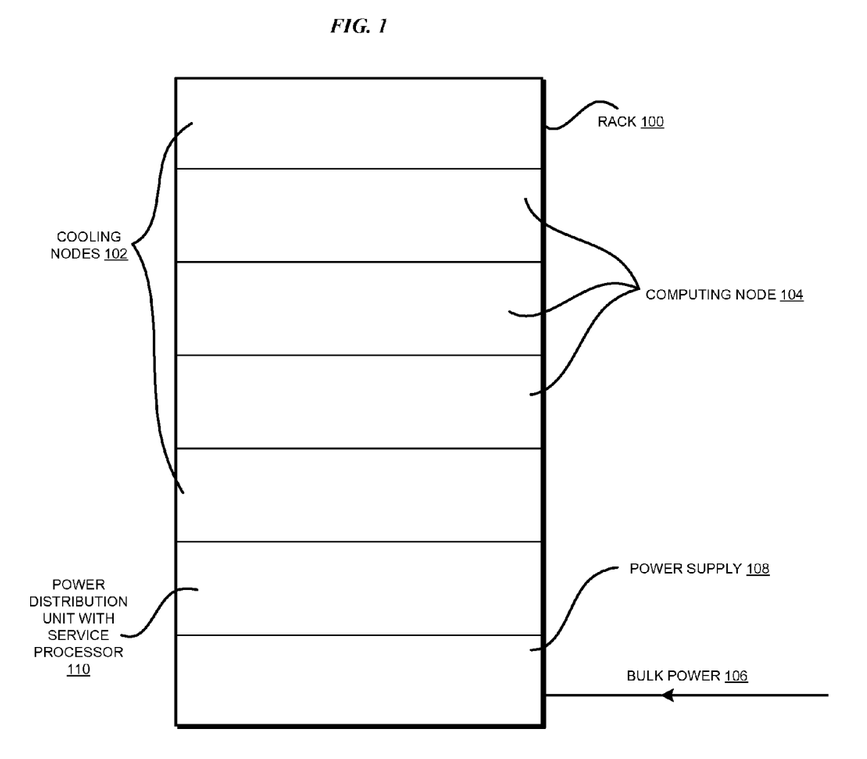
FIG. 1 depicts a block diagram of a data processing environment configuration in which illustrative embodiments may be implemented.
Figure 2:
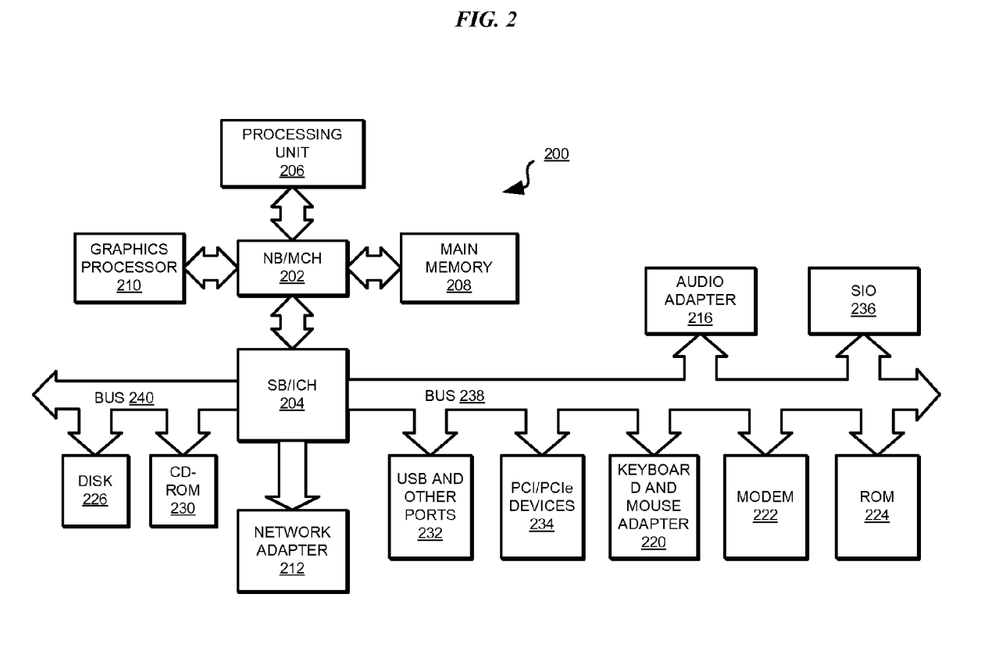
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a data processing environment configuration in which illustrative embodiments may be implemented. Rack 100 may be an example configuration of data processing systems and other systems.

For example, rack 100 may include cooling nodes 102 and computing nodes 104. Bulk power 106 may be supplied to power supply unit 108. Power distribution unit 110 may distribute power to cooling nodes 102 as well as computing nodes 104. Power distribution unit 110 may include a data processing system, such as a service processor, to perform computations relating to power distribution.

Rack 100 may also include other systems and devices (not shown). For example, rack 100 may include data storage devices, networking equipment, cabling for data and power, battery-based power supplies, display devices, mechanical fans, liquid radiators, and other systems and devices commonly found in data processing environments, such as a data center.

With reference to FIG. 2, this figure depicts a block diagram of a data processing system in which illustrative embodiments may be implemented. Data processing system 200 is an example of a computer, such as power distribution unit 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
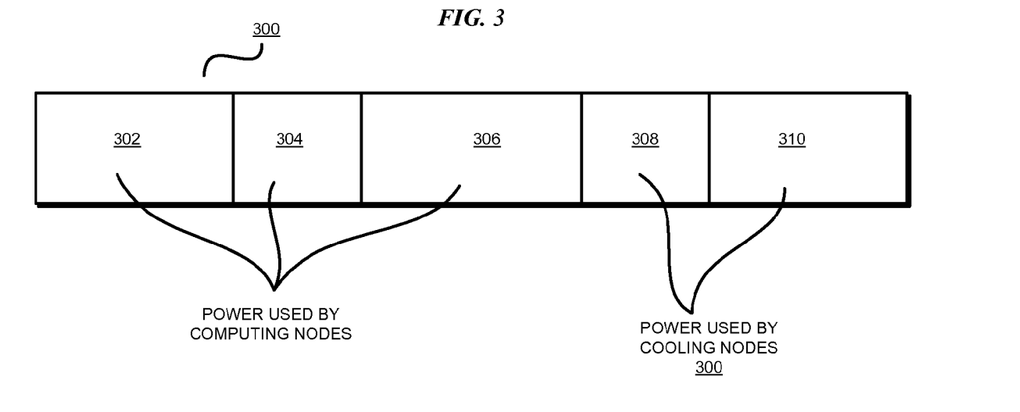
FIG. 3 depicts chart of power consumption in a data processing environment configuration with respect to which an illustrative embodiment may be implemented.

With reference to FIG. 3, this figure depicts chart of power consumption in a data processing environment configuration with respect to which an illustrative embodiment may be implemented. Power consumption chart 300 may depict power consumed by various components of a data processing environment configuration, such as rack 100 in FIG. 1.

As an example, chart 300 may include blocks 302, 304, 306, 308, and 310. Blocks 302-306 may represent the amount of power consumed by each of three example computing nodes respectively in the configuration. Blocks 308 and 310 may represent the amount of power consumed by each of two example cooling nodes respectively in the configuration.

Figure 4:
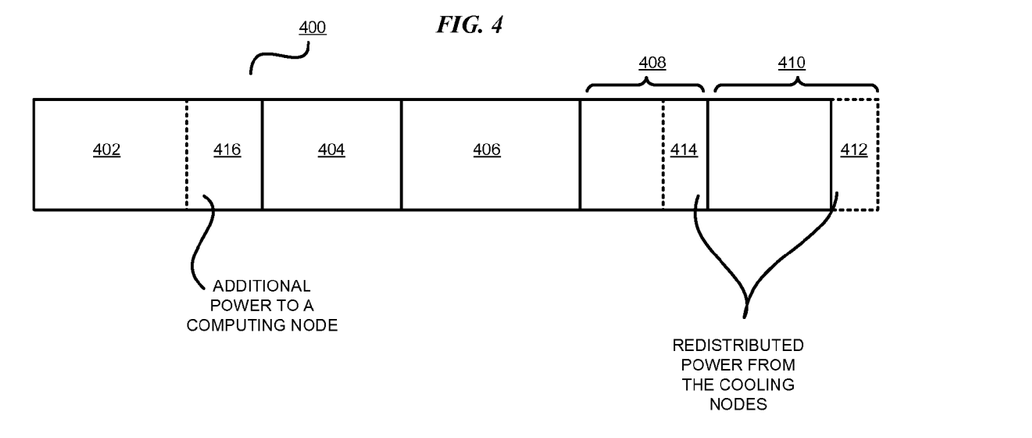
FIG. 4 depicts chart of power redistribution in a data processing environment configuration in accordance with an illustrative embodiment.

With reference to FIG. 4, this figure depicts chart of power redistribution in a data processing environment configuration in accordance with an illustrative embodiment. Power consumption chart 400 may be similar to chart 300 in FIG. 3 with additional depictions of power redistribution among the various components of a data processing environment configuration, such as rack 100 in FIG. 1.

As an example, chart 400 may include blocks 402, 404, 406, 408, and 410 similar to corresponding blocks in chart 300 in FIG. 3. Assume that chart 400 from end to end represents the total bulk power available to the configuration. In other words, chart 400 cannot be made longer by adding more bulk power but power can be redistributed within chart 400 according to an embodiment.

As an example to illustrate the operation of an embodiment, assume that one of the computing nodes is operating with power consumption represented by block 402. Further, assume that the node may require additional power 416 under certain circumstances.

According to an embodiment, a computation is made to determine whether cooling of the configuration can be adjusted such that power directed to one or more of the cooling nodes can be reduced. The cooling may be adjusted, such as by reducing the speed, duty cycle, frequency, or another characteristic of the cooling node. For example, assume that the speed of the cooling node, whose power consumption is represented as block 410, can be reduced. Accordingly, the power being supplied to that cooling node can be reduced by amount 412.

Further, as an example, assume that reducing the speed to increase block 412 may not be desirable. For example, the corresponding cooling node may begin to underperform if the speed is reduced below a threshold. Another cooling node's power consumption represented by block 408 may be reduced by amount 414 by reducing the node's duty cycle. The sum of amounts 412 and 414 thus become available for redistribution within the configuration without an adverse effect on the performance or cooling of the configuration.

Amount of power represented by blocks 412 and 414 can be redistributed to one or more computing nodes. For example, the computing node whose power consumption is represented by block 402 may be configured to receive all or part of the amounts 412 and 414 as additional power 416.

The power redistribution depicted in FIG. 4 is only an example. Power to cooling nodes and computing nodes in any given configuration may be increased or reduced as needed within the scope of the invention. For example, one cooling node may be adjusted to use less power whereas another cooling node and a computing node may be reconfigured to use more power as compared to a prior state of those cooling and computing nodes.

As another example, one computing node may be adjusted to use less power whereas a combination of a cooling node and another computing node may be reconfigured to use more power as compared to a prior state of those cooling and computing nodes. Generally, power can be redistributed within the configuration of cooling and computing nodes by computing whether reducing power to one subset of nodes and redistributing that saved power to another subset of nodes will result in an overall improvement of the performance of configuration. A set of nodes is any combination of one or more computing node and one or more cooling nodes.

Furthermore, a power distribution scheme, such as the power distribution schemes depicted in charts 300 and 400 in FIGS. 3 and 4 respectively, can be computed at any time. For example, in one embodiment, a power distribution or redistribution scheme may be computed at the time the power demand in the configuration exceeds bulk power availability.

In another embodiment, a power redistribution scheme, such as in FIG. 4, may be computed predictively ahead of the time of such demand. For example, an embodiment may utilize an energy consumption model of various workloads to determine whether a computing node is likely to experience a workload whose energy consumption model may cause the total power demand in the configuration to exceed to bulk power available.

Figure 5:
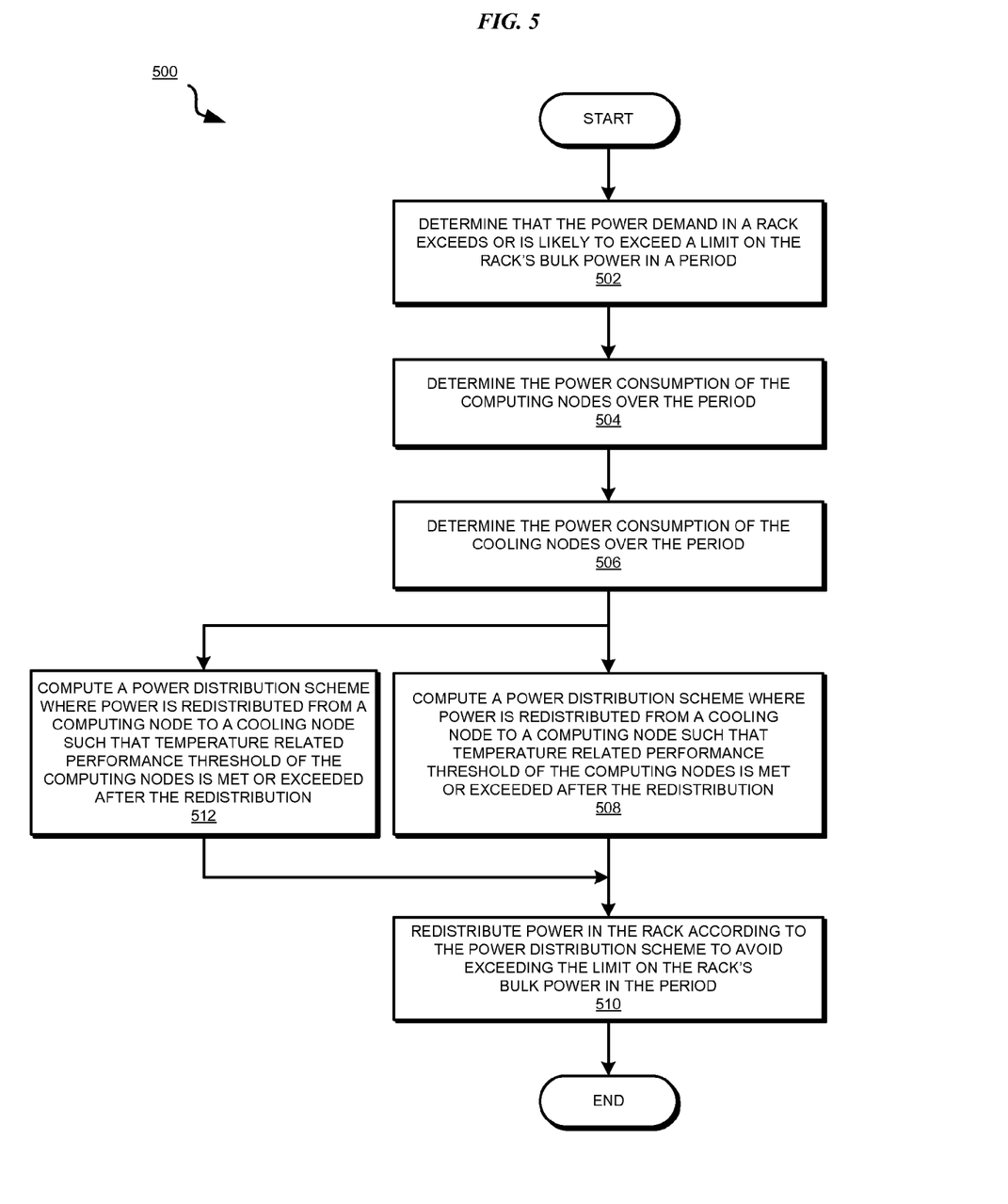
FIG. 5 depicts a flowchart of a process of power distribution considering the cooling nodes in accordance with an illustrative embodiment.

With reference to FIG. 5, this figure depicts a flowchart of a process of power distribution considering the cooling nodes in accordance with an illustrative embodiment. Process 500 may be implemented in conjunction with a power distribution system, such as in a service processor of a rack. For example, process 500 may be implemented using the service processor of power distribution unit 110 in FIG. 1.

Process 500 begins by determining that the power demand in a configuration, such as a rack, exceeds or is likely to exceed a limit on the rack's bulk power in a given period (step 502). Process 500 determines the power consumption of the computing nodes over that period (step 504). Process 500 determines the power consumption of the cooling nodes over that period (step 506).

Depending on the circumstances of power consumption, process 500 may execute step 508, step 510, or both. For example, process 500 may consider current power scheme, current and future workloads on the computing nodes, ambient or altitude conditions, bulk power availability at any given time, and other factors to determine whether to execute step 508, step 510, or both.

Depending on one set of circumstances, process 500 may compute a power (re)distribution scheme where power is redistributed from a cooling node to a computing node such that a temperature related performance threshold of the computing nodes is met or exceeded after the redistribution (step 508). Depending on another set of circumstances, process 500 may compute a power (re)distribution scheme where power is redistributed from a computing node to a cooling node such that a temperature related performance threshold of the computing nodes is met or exceeded after the redistribution (step 510). Depending on another set of circumstances, process 500 may execute both steps 508 and 510.

Process 500 may redistribute power in the configuration according to the power distribution scheme computed in a combination of steps 508 and 510 to avoid exceeding the limit on the configuration's bulk power availability in the period (step 512). Process 500 may end thereafter or continue to step 502 and repeat in a loop for a different period.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for power distribution considering the cooling nodes in a data processing environment. Using the embodiments of the invention, a data processing environment can redistribute power from a cooling node to a computing node, and vice versa, in a given data processing environment configuration to remain within a given bulk power limit. Using an embodiment, the data processing environment configuration may be able to deliver improved computing performance while remaining in the prescribed power envelope.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for power distribution considering a cooling node, the computer implemented method comprising:
    determining a power demand of a data processing environment for a period, the data processing environment comprising a set of computing nodes and cooling nodes;
    determining that the power demand will exceed a limit on electrical power available to the data processing environment for the period if the computing nodes and the cooling nodes in the data processing environment are operated in a first configuration; and
    redistributing a first amount of power, wherein the redistributing the first amount of power is both (i) from a first cooling node in the data processing environment to a first computing node in the data processing environment, and (ii) from a second computing node in the data processing environment to a second cooling node in the data processing environment, such that a temperature related performance threshold of a subset of computing nodes is at least met.

2. The computer implemented method of claim 1, further comprising:
    computing a first power consumption of a subset of computing nodes in the data processing environment; and
    computing a second power consumption of a subset of cooling nodes in the data processing environment, wherein the first and the second power consumption are used in performing the redistributing.

3. The computer implemented method of claim 1, wherein the set of computing and cooling nodes receives electrical power from a common power source.

4. The computer implemented method of claim 1, wherein the redistributing causing the computing nodes and the cooling nodes in the data processing environment to operate in a second configuration.

5. The computer implemented method of claim 4, wherein the second configuration includes a cooling node in the set of computing and cooling nodes operating at a reduced speed in the second configuration as compared to a speed of the cooling node in the first configuration.

6. The computer implemented method of claim 1, wherein the redistributing further causes the power demand to remain at most at the limit in the period.

7. A computer usable program product comprising a non-transitory computer usable storage medium including computer usable code for power distribution considering a cooling node, the computer usable code comprising:
    computer usable code for determining a power demand of a data processing environment for a period, the data processing environment comprising a set of computing nodes and cooling nodes;
    computer usable code for determining that the power demand will exceed a limit on electrical power available to the data processing environment for the period if the computing nodes and the cooling nodes in the data processing environment are operated in a first configuration; and
    computer usable code for redistributing a first amount of power, wherein the redistributing the first amount of power is both (i) from a first cooling node in the data processing environment to a first computing node in the data processing environment, and (ii) from a second computing node in the data processing environment to a second cooling node in the data processing environment, such that a temperature related performance threshold of a subset of computing nodes is at least met.

8. The computer usable program product of claim 7, further comprising:
    computer usable code for computing a first power consumption of a subset of computing nodes in the data processing environment; and
    computer usable code for computing a second power consumption of a subset of cooling nodes in the data processing environment, wherein the first and the second power consumption are used in performing the redistributing.

9. The computer usable program product of claim 7, wherein the set of computing and cooling nodes receives electrical power from a common power source.

10. The computer usable program product of claim 7, wherein the redistributing causing the computing nodes and the cooling nodes in the data processing environment to operate in a second configuration.

11. The computer usable program product of claim 10, wherein the second configuration includes a cooling node in the set of computing and cooling nodes operating at a reduced speed in the second configuration as compared to a speed of the cooling node in the first configuration.

12. The computer usable program product of claim 7, wherein the redistributing further causes the power demand to remain at most at the limit in the period.

13. A data processing system for power distribution considering a cooling node, the data processing system comprising:
    a storage device including a storage medium, wherein the storage device stores computer usable program code; and
    a processor, wherein the processor executes the computer usable program code, and wherein the computer usable program code comprises:
        computer usable code for determining a power demand of a data processing environment for a period, the data processing environment comprising a set of computing nodes and cooling nodes;
        computer usable code for determining that the power demand will exceed a limit on electrical power available to the data processing environment for the period if the computing nodes and the cooling nodes in the data processing environment are operated in a first configuration; and
        computer usable code for redistributing a first amount of power, wherein the redistributing the first amount of power is both (i) from a first cooling node in the data processing environment to a first computing node in the data processing environment, and (ii) from a second computing node in the data processing environment to a second cooling node in the data processing environment, such that a temperature related performance threshold of a subset of computing nodes is at least met.

14. The data processing system of claim 13, further comprising:
   computer usable code for computing a first power consumption of a subset of computing nodes in the data processing environment; and
   computer usable code for computing a second power consumption of a subset of cooling nodes in the data processing environment, wherein the first and the second power consumption are used in performing the redistributing.

* * * * *